Nov. 11, 1924.

R. KINNEAR

CARGO HOOK

Filed Oct. 25, 1922

1,514,772

Robert Kinnear
By Mason, Fenwick & Lawrence
Attorneys.

Patented Nov. 11, 1924.

1,514,772

UNITED STATES PATENT OFFICE.

ROBERT KINNEAR, OF DUNEDIN, NEW ZEALAND.

CARGO HOOK.

Application filed October 25, 1922. Serial No. 596,809.

*To all whom it may concern:*

Be it known that I, ROBERT KINNEAR, a subject of King George V of Great Britain, residing at 40 Dowling Street, Dunedin, in the Dominion of New Zealand, have invented certain new and useful Improvements in Cargo Hooks, of which the following is a specification.

This invention relates to cargo hooks.

The object of the present invention is to provide a safety hook.

I am aware there are safety hooks, but they are more or less cumbersome; their pivoted tongue member requires manual adjustment to hook the sling, while others designed to obviate manual adjustment have objectionable defects; as for example, a rigid tongue member projecting beyond the bill of the hook sufficient to leave a space for the entry of the sling; this projection catches on hatch combings and the like, and is generally a menace.

The present invention comprises a particularly satisfactory and efficient means for overcoming all these defects, and reference may be had to the accompanying sheet of drawings, which form part of this specification, and in which—

Figure 1:
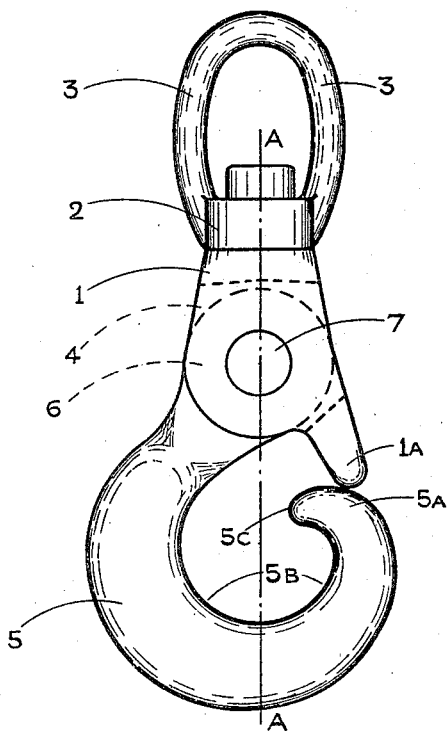
Figure 1 is a side elevation of the invention.
Figure 2:
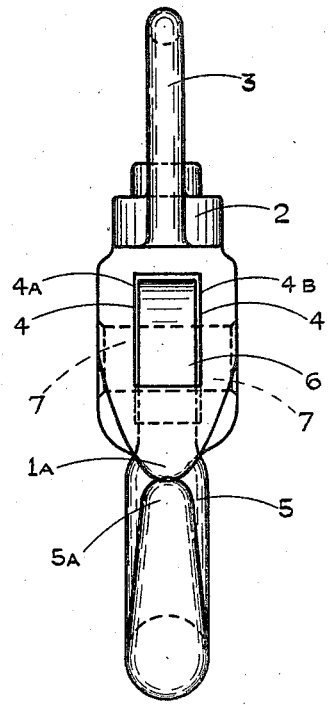
Figure 2 is an end elevation.

I make the member 1 the swivel connection 2 with the jib chain 3, and provide a mortise 4 in the said member 1, within which a hook 5 provided with an eye member 6 is housed, having a lateral pin 7 passing through the walls of $4^A$ and $4^B$ of the mortise 4 in the member 1, and through the eye piece of the hook 5 to connect the members 1 and 5. The shearing strain of the lateral pin 7 is equivalent to the tensile strain of the member 1, with a factor of safety.

The hook 5 thus pivotally suspended on the lateral pin 7 will hang plumb due to its own weight, with its bill $5^A$ in close contact with a guard member $1^A$ dependent from the member 1. The inner contour $5^B$ of the bill point of the hook 1 is preferably archimedean, with the point $5^C$ of the bill a specified distance from the centre, so that if weight should be suddenly taken off the sling, the danger of jumping the hook is lessened.

Figure 3:
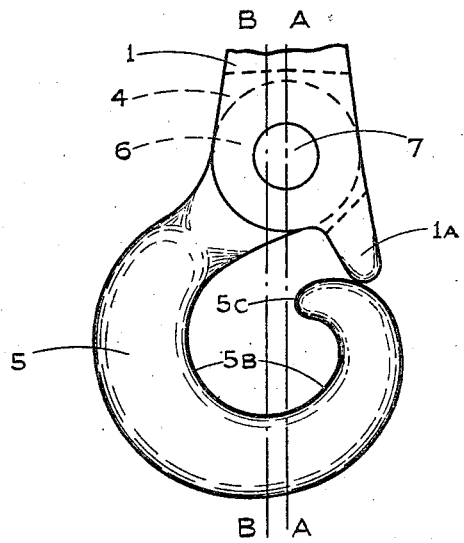
Figure 3 is an alternative design of my invention.

In an alternate design as indicated in Figure 3, the lateral pin 7 suspending the hook 5 may be disposed slightly off a perpendicular projected from the centre from which the bottom part of the hook is described; this construction is indicated by dotted lines A—A, B—B, so that when the hook is hanging due to its own weight or suspending a load, it will have a tendency to bear against the guard member $1^A$ with a certain amount of pressure.

Having thus described my invention, what I claim as new and desire to secure by Letters Patent is:

In a cargo hook, the combination of a head having a swivel member at one end thereof and a bearing opening extending transversely through said head in alinement with said swivel member, a hook pivoted in said bearing opening, a tapered finger projecting downwardly and forwardly from the head at one side of the pivot of said hook and having a rounded nose, the hook having a curved inwardly extending nose underlying the terminal of said finger.

In testimony whereof I affix my signature.

ROBERT KINNEAR.

Witnesses:
MABEL MCREEMAN,
ROBERT PARK, Jr.